US011793301B2

(12) United States Patent
Miller et al.

(10) Patent No.: US 11,793,301 B2
(45) Date of Patent: Oct. 24, 2023

(54) ADVANCED ORAL HYGIENE FORCE REGULATION AND TECHNIQUE IMPROVEMENT APPARATUS AND METHOD

(71) Applicants: David Kyle Miller, Washington, DC (US); James Lowell Ramsey Clarke, Washington, DC (US)

(72) Inventors: David Kyle Miller, Washington, DC (US); James Lowell Ramsey Clarke, Washington, DC (US)

(73) Assignee: Forward Entertainment & Technology, LLC, Washington, DC (US)

( * ) Notice: Subject to any disclaimer, the term of this patent is extended or adjusted under 35 U.S.C. 154(b) by 319 days.

(21) Appl. No.: 15/951,172

(22) Filed: Apr. 12, 2018

(65) Prior Publication Data

US 2018/0295979 A1 Oct. 18, 2018

Related U.S. Application Data

(60) Provisional application No. 62/484,870, filed on Apr. 12, 2017.

(51) Int. Cl.
*A46B 15/00* (2006.01)
*A61C 17/34* (2006.01)
(Continued)

(52) U.S. Cl.
CPC .......... *A46B 9/045* (2013.01); *A46B 15/0006* (2013.01); *A46B 15/0026* (2013.01);
(Continued)

(58) Field of Classification Search
CPC ............ A46B 15/0012; A46B 15/0004; A46B 15/0006; A46B 15/0008; A46B 15/0016;
(Continued)

(56) References Cited

U.S. PATENT DOCUMENTS

| 4,795,347 A | * | 1/1989 | Maurer | A61C 17/38 |
| | | | | 15/22.1 |
| 6,140,723 A | * | 10/2000 | Matsui | B06B 1/045 |
| | | | | 15/22.4 |

(Continued)

*Primary Examiner* — Daniel J Colilla
(74) *Attorney, Agent, or Firm* — Leverage Law Firm, LLC; James Clarke

(57) ABSTRACT

An apparatus and system for cleaning oral cavities via a device with predetermined optimally imposed methods to remove germs, bacteria, tartar and plaque, which have been clinically proven to cause gum disease and tooth loss, efficiently and with minimal abrasion to tooth enamel and gums. Variations of this disclosure include but are not limited to embodiments where the device utilizes any of the aforementioned components to achieve the intended function. However, a preferred embodiment of this disclosure comprises an electrically controlled magnetic field to allow optimal contact pressure in the mouth, a motion device capable of tracking motion coordinates to record daily cleaning methods and to inform recommendations and web enabled capability to store activity over time, a scrolling toothbrush and gum cleaning device or a stationary mouth guard device applying the same force dampening and applying technology in a more automated fashion.

6 Claims, 18 Drawing Sheets

(51) Int. Cl.
*A46B 9/04* (2006.01)
*A61C 17/22* (2006.01)
*A61C 17/02* (2006.01)
*A61C 15/04* (2006.01)
*A46B 5/00* (2006.01)

(52) U.S. Cl.
CPC ........ *A46B 15/0038* (2013.01); *A61C 15/047* (2013.01); *A61C 17/0202* (2013.01); *A61C 17/221* (2013.01); *A61C 17/34* (2013.01); *A46B 5/0012* (2013.01); *A46B 2200/1066* (2013.01); *A61C 15/046* (2013.01)

(58) Field of Classification Search
CPC ............ A46B 15/0026; A46B 15/0038; A46B 15/0044
See application file for complete search history.

(56) References Cited

U.S. PATENT DOCUMENTS

| | | | |
|---|---|---|---|
| 6,453,497 B1* | 9/2002 | Chiang | A61C 17/00 15/201 |
| 10,512,529 B2* | 12/2019 | Wills | A61C 17/34 |
| 2009/0143914 A1* | 6/2009 | Cook | A46B 15/0006 700/275 |
| 2012/0151698 A1* | 6/2012 | Schaefer | A61C 17/222 15/28 |
| 2016/0038762 A1* | 2/2016 | Lin | A61N 5/0603 433/29 |
| 2016/0331119 A1* | 11/2016 | Schaefer | A61C 17/221 |
| 2017/0020277 A1* | 1/2017 | Barnes | A46B 15/0034 |
| 2018/0125623 A1* | 5/2018 | Serval | A46B 15/0006 |
| 2019/0313785 A1* | 10/2019 | Jimenez | A61L 2/10 |

* cited by examiner

ADVANCED ORAL HYGIENE FORCE REGULATION AND TECHNIQUE IMPROVEMENT APPARATUS AND METHOD

CROSS-REFERENCE TO RELATED APPLICATION

This application claims the benefit of U.S. Provisional Application No. 62/484,870 filed Apr. 12, 2017. The entire disclosure of U.S. Provisional Application No. 62/484,870 is incorporated herein by reference.

TECHNICAL FIELD

The general field of the disclosure herein relates to the design of a semi-autonomous device and associated components for improved oral hygiene. A novel aspect of this invention is the dampening system. In some preferred embodiments of the present disclosure the invention exploits physical principles to create an electromagnetic field. In such embodiments, a magnetic field is created to regulate the force exerted between the device, and ultimately the user and his or her teeth or gums. Other embodiments may involve directly applied mechanical means to dampen the force applied, including but not limited to springs, elastomers, or one or more motors that adjust the force applied in response to a sensor that detects one or more criteria, including but not limited to time, location, or shape of the gum-line. In some embodiments the dampening system may be embedded in an oral hygiene holder, including but not limited to a toothbrush holder, floss driver, or tongue-scraper clasper. In other embodiments the dampening system may be embedded directly into the oral hygiene device, including but not limited to a mechanical toothbrush, water flosser, or tongue scraper. In yet other embodiments the device may be a multi-functional longitudinal motorized device that drives along gum-line and cleans the mouth or maw of the user by means including but not limited to brushing along the users gum-line, stopping momentarily at the spaces between teeth to drive floss up and down the crevices to remove debris, or spraying mouthwash or tooth polish at select locations from a fluid reservoir located within the device. In certain preferred embodiments, such a motorized unit may have a foam or similar soft material to protect the gums. In yet other preferred embodiments the apparatus may be a unit shaped to line the contours of the user's teeth, tongue, and/or other components of the user's inner mouth and utilize cleaning and/or cosmetic mechanisms including but not limited to brushes, ultra-violet light, ionic magnets, mouthwash, and/or chemicals such as peroxide or other whitening agents.

BACKGROUND

Before toothbrushes, people used rough cloth and water to clean their teeth. They would also rub things like salt and chalk across their teeth to try to get rid of the grime. As long ago as 3000 BC, the ancient Egyptians constructed crude toothbrushes from twigs and leaves to clean their teeth. These sticks were rubbed against the teeth. The bristle toothbrush, similar to the type used today, was not invented until 1498 in China. The bristles were actually the stiff, coarse hairs taken from the back of a hog's neck and attached to handles made of bone or bamboo. The first documented toothbrush that closely resembles the ones typically used today was made in England in the 1770s. Records show that a man named William Addis came up with the idea while he was in prison, put there for having started a riot. He didn't think the rag he was given was cleaning his teeth well enough, so he saved a small bone from a meal. He put tiny holes in it and used glue to attach pig bristles he had gotten from a prison guard. The first patent for a toothbrush was awarded to an American named H. N. Wadsworth in 1857, but it wasn't until the invention of nylon in the 1930s that toothbrushes came to look like the ones you use. It wasn't until after World War II that Americans started brushing their teeth regularly. (Strauss, Valerie, Washington Post, "Ever Wondered How People Cleaned Their Teeth Before They Had Toothbrushes?" Apr. 13, 2009 www.washingtonpost.com/wp-dyn/content/article/2009/04/12/AR2009041202655.html Read Mar. 27, 2017)).

Since the 1930s, the tools and methods for cleaning one's teeth have remained relatively unchanged, while our knowledge of the importance of good oral hygiene has improved dramatically. While common practices such as brushing and flossing twice a day have been widely disseminated, a staggering number of elderly Americans suffer from diseases related to poor oral hygiene and many even require dentures later in their lives. Despite the advances in chronic, or acute, dental treatment, much more has to be done to address preventative measures, specifically how to improve oral hygiene leveraging tools and procedures that are used on a daily basis.

Recent forays into dental hygiene patents include vibration dampening toothbrushes (Cacka, Joe W., Chiles, Howell H., 2005, Toothbrush, Water Pik, Inc. (CO, US) U.S. Pat. No. 6,920,659; WO/2002/054906; 20020120991), toothbrushes with interchangeable parts (Jimenez, Eduardo J. et al., 2010, Toothbrush, Colgate-Palmolive Company (NY, US), EP2258307), manual toothbrushes designed to assist in evenly distributing the amount of force applied (Rauch, Samuel (NY, US), 1984, Toothbrush, U.S. Pat. No. 4,472,853), toothbrushes designed to be appealing for use by children ergonomically (Jimenez, Eduardo J. et al., 2010, Toothbrush Colgate-Palmolive Company (NY, US), 20070050931), toothbrushes with flexible elements (Brown Jr., William R. et al., 2016, Oral hygiene implements having flexible elements, and methods of making the same, The Gillette Company (MA, US), U.S. Pat. No. 9,504,312), toothbrushes (manual or motorized) with indicator mechanisms that are notable by the user during use (Jungnickel, Uwe, Altmann, Niclas, 2016, Oral hygiene implement, Braun GmbH (Kronberg, Del.), 9439740), and a force sensing oral care instrument that provides feedback to the user for self-adjustment (Jungnickel, Uwe, Altmann, Niclas, Guebler, René, 2014, Force sensing oral care instrument, Braun GmbH (Kronberg, Del.), 8832895). None of these devices however deal with the automated regulation of pressure applied in cleaning of one's oral components, including but not limited to the teeth, gums, or tongue.

This device will enable users to ensure that they are brushing in an optimal manner for the prescribed amount of time. The dampening mechanism implemented through the use of a magnetic device or some other means will allow user to brush their teeth and gums longer with less abrasion and, as a result, less damage to tooth enamel and gums. This device through leveraging motion sensing software will allow user to ensure that they are adequately covering their entire mouths, as well as being reminded to use target areas that their dental professional have mentioned, and finally the ability to even to receive advice on best practice brushing methods via some web enabled application. These practical improvements could, individually, all rapidly improve oral health care, taken together they represent an advancement in the methods and practices used to maintain oral hygiene, However the most radical advancement is the decoupling of forces imparted by the user on their teeth, this device facilitates new and novel motions to transform what were once considered brushing mechanics into an ability to impart semi-autonomous motion to oral cavities and improve outcomes.

SUMMARY OF THE INVENTION

This disclosure is an apparatus and system for a magnetized oral hygiene device to be used regularly in order to standardize, optimize and monitor the efficacy of methods to improve oral hygiene, while minimizing the damage due to abrasion to improve oral health. Among the objectives of this disclosure are: to describe the embodiments of the invention sufficiently for someone of ordinary skill in the art to comprehend, to illustrate and describe the various embodiments and their components, including but not limited to an oral hygiene instrument holder with force dampening and/or force applying technology, a motorized semi-autonomous tooth scrolling oral cleaner, or a stationary, form-fitting oral cleansing device, and to provide related variations of a design that accomplishes the feat of decoupling forces imparted onto the cleaning device by the user from the forces that are transferred to the brush which contact the mouth during cleanings through various means of dampening including but not limited mechanical methods either compressible fluids, materials, springs, or use of magnetic fields, or any conceived autonomous methods for cleaning oral cavities without requiring any force to be imparted by the user, or any combination of the aforementioned.

The primary components of such embodiments of the device are the holder and the oral hygiene device; a magnetic field will exist between these two components. A current source and current regulating mechanism are required to generate and adjust magnetic flux in certain such embodiments. The magnetic field intensity is a function of that flux and material properties of the device. In some such embodiments the intensity of the magnetic field can be adjusted by means including but not limited to a dial located on the holder by changing the current in the circuit, which will select the pressure that can be exerted on a tooth for example, within an oral cavity, a switch to accomplish the same in increments, or a sensor that acts in response to the shape of the gum-line.

In certain embodiments during instances when the user applies a given force via the holder, that force cannot be imparted in the mouth until the magnetic field between the holder and the brush is overcome. In some such embodiments, the point at which the magnetic field is overcome is marked by contact between the brush and the holder. In some such embodiments, the brush and the holder will not be in contact when the user implies less force than required to overcome the selected force of the given magnetic field. In some such embodiments the strength of the magnetic field will determine how much force is imparted by the user into the mouth. In some certain such embodiments contact will initiate a gentle corrective vibration and/or a mild lighting indicator until the user reduces the force applied on the holder and as a result in the mouth and the two components lose contact. In other preferred embodiments, a control system will exist that counteracts the force of the user. In such embodiments, when a user applies a given force to the holder, the magnetic field will provide a force equal and opposite of the direction provided by the user, less the force necessary to generate the minimal amount of friction required to clean teeth. The counter-balancing effect ability of the control system allows the user a regular an unmodified force without ever exceeding the desired magnitude of force desired. In other such embodiments instead of the force applied by the magnetic field being less than or equal to the force applied by the user so as to generate the minimal amount of friction required to clean teeth, the user merely needs to move the oral hygiene device near to the mouth and the magnetic field will activate so as to apply the force needed to clean teeth, by means including but not limited to the user depressing a button, receiving an audio command from the user, or camera's on the unit designed to recognize the proximity of teeth. In some preferred embodiments the brush may be a motorized in order to achieve a full range of motion in which the response can be dampened, while also achieving enough rigidity to exert control and an amount of friction sufficient to clean teeth, the holder and the brush may be anchored together at their bases, via a universal joint, while still allowing a full 360 degree range of motion in one plane.

In other embodiments the apparatus may be an oral hygiene instrument holder (including but not limited to a toothbrush holder, floss pick holder, water flosser holder, or tongue cleanser holder) with an adjustable force dampening or force applying setting. In some such embodiments the force and or direction of the instrument held, and or the means of coupling the instrument to the holder, may include but are not limited to a clamping mechanism in some such embodiments utilizing a plurality of tongs attached to the holder to grasp the instrument, an elastic grasping mechanism utilizing one or more elastic mechanisms to twist and tighten around the instrument thus holding it in place and/or directing it, a magnetic coupling mechanism magnetically attaching itself to one or more magnets on the instrument allowing the holder to direct the instrument, and/or a screw in mechanism allowing the instrument to be screwed into the holder one of the two having a male connection component and the other a female.

Some other embodiments of the present disclosure may involve a motorized scrolling device which can scroll along the users gum-line. In some such embodiments the motorized scrolling device may have a plurality of brushes which may utilize the force dampening and applying technology to clasp around the users teeth as it scrolls back and forth along the row of teeth it is attached to. In certain embodiments the turning of certain brushes may allow the motorized scrolling device to move from one tooth to the next. In certain preferred embodiments the device may have a liquid containment chamber which may be utilized to apply a variety of pastes, gels or liquids to user, including but not limited to toothpaste, mouthwash, or peroxide whitening. In other such embodiments the motorized scrolling device may have a bar connecting one or more such devices, such that when a particular motor on the device turns, components including but not limited to gears, pulleys, or magnets will allow the device to propel itself along the bars as it scrolls along the user's gum-line. In certain preferred embodiments the scrolling device may further comprise a floss drawing system allowing the device to pull floss from one end of the device to another as it scrolls, such that as the device moves along the gum-line, clean floss may be drawn into an opening, and pushed into the gaps between the users teeth by mechanisms including but not limited to a piston system, a hydraulic system, or an additional motorized system. In other embodiments the scrolling device may include an instrument for bacterial disinfection, including but not limited to an ultra violet light emitter, a bacteria inhibitor, or an ionic generator.

Other embodiments of the present disclosure may be stationary devices such as a mouth guard, including components such as those found in the scrolling device embodiments. These may include but are not limited to a scrolling brush cleaner which moves along the contours of the mouth guard, a plurality of brushes within the stationary device which may apply force sensing technology, an ionic or ultraviolet emitter, fluid chambers and spraying devices for mouthwash or tooth whitening applications floss scrolling and injection or similar oral cleansing mechanisms. Any of the above described embodiments may be varied in additional embodiments include charging mechanisms including but not limited to components for plugging them in, solar energy collection, rechargeable batteries that may be utilized with charging pads, replaceable batteries, or wireless charging mechanisms. Other variations may include wired or wireless transmission technology allowing a camera or programmed representation to display data including but not limited to a representation of the user's oral health, the force being applied, or the activity occurring in the user's mouth, on devices including but not limited to a cellular device, a television, or a wireless mirror.

While the preferred embodiments of the disclosure are shown in the accompanying drawings, it to be understood that said embodiments are susceptible to modification and alteration while still maintaining the spirit of my invention.

BRIEF DESCRIPTION OF THE DRAWINGS

Referring to the drawings.

DETAILED DESCRIPTION

Figure 1:
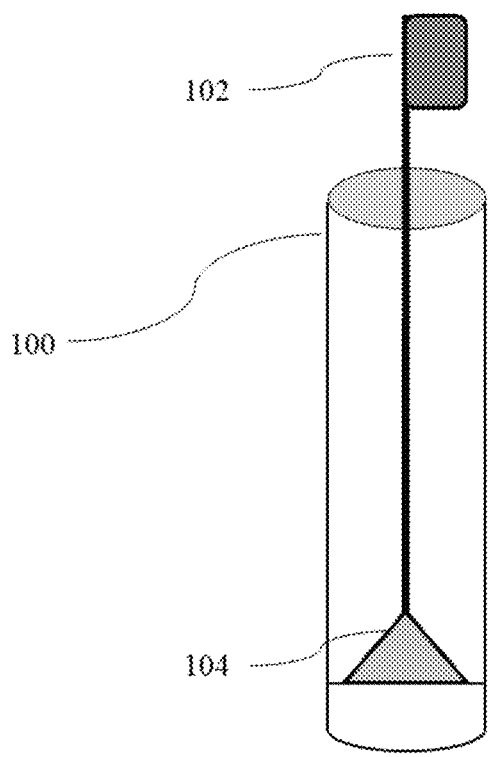
FIG. 1 is an illustration of an exemplary oral hygiene device and holder, in this case a toothbrush holder.
Figure 2:
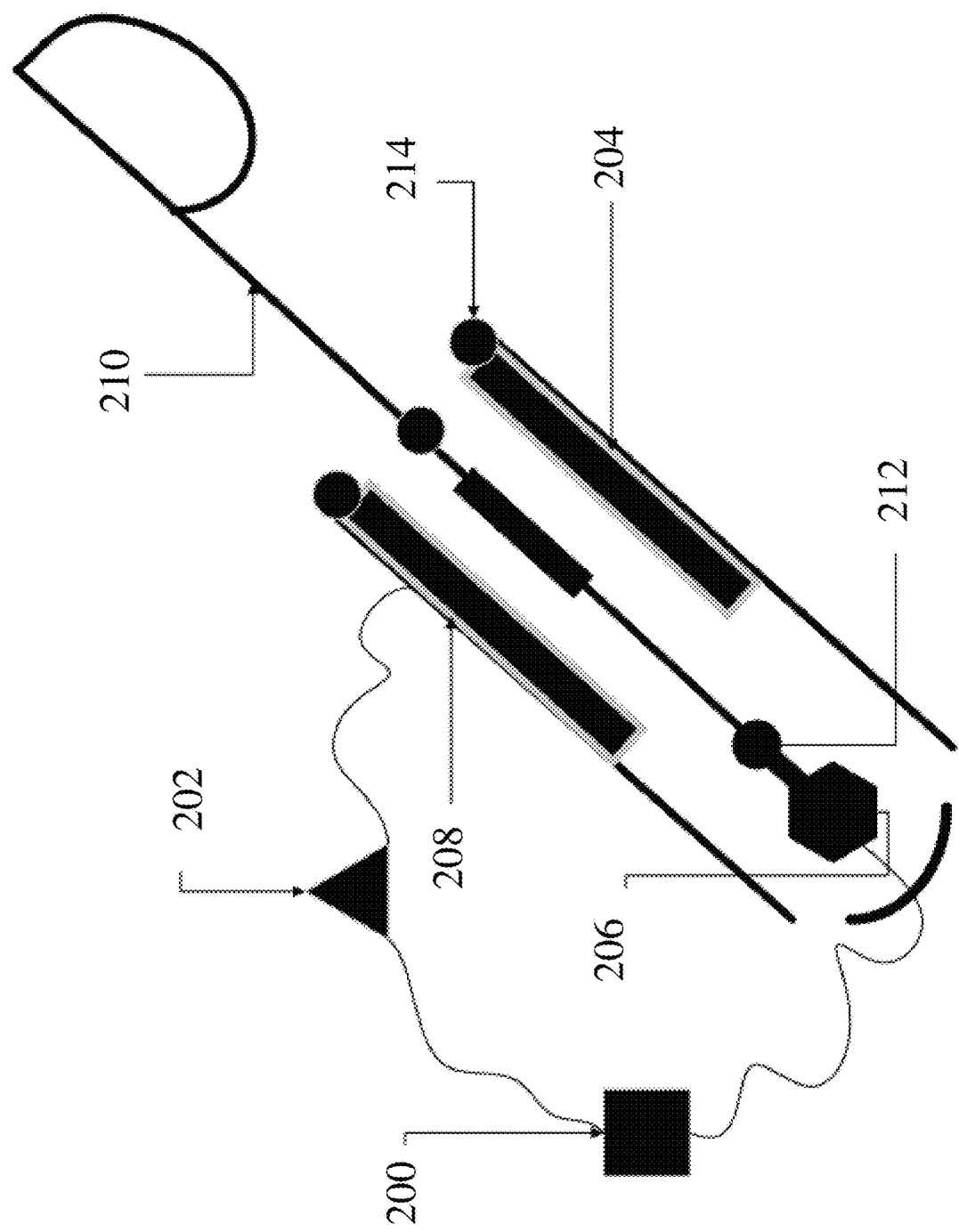
FIG. 2 illustrates a line drawing of an oral hygiene device and holder with a pivoting base, magnetic field dampening device and associated peripherals.
Figure 3:
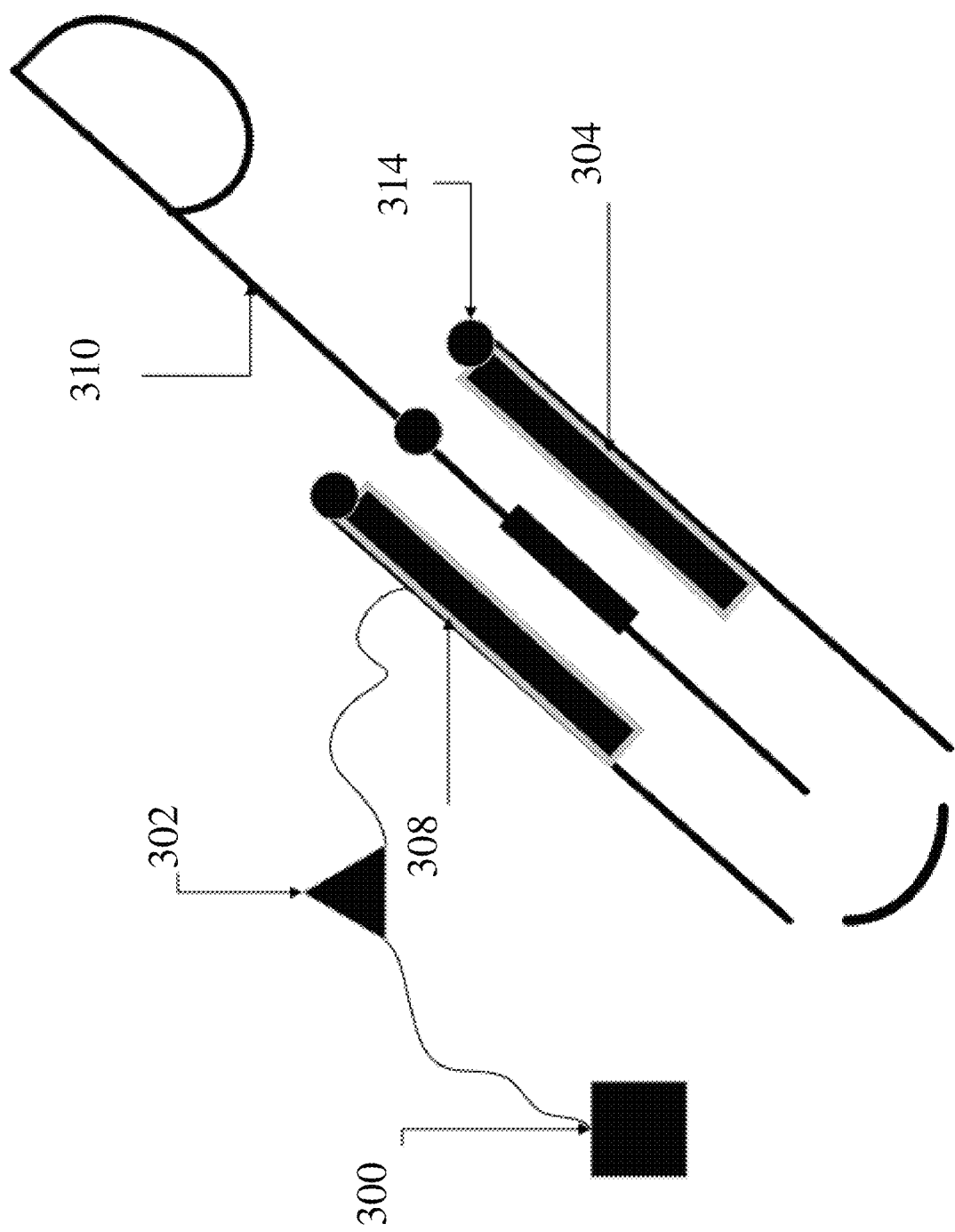
FIG. 3 illustrates a line drawing of an oral hygiene device and holder with a magnetic field dampening device and associated peripherals.
Figure 4:
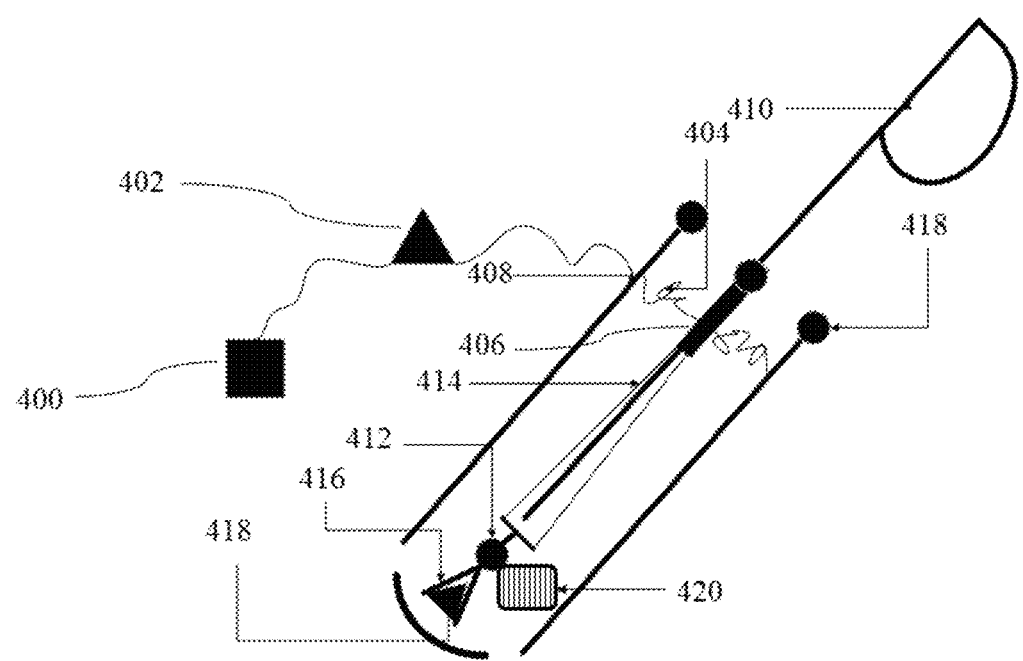
FIG. 4 shows a line drawing of an oral hygiene device and holder with a pivoting base, mechanical linkage, rotating motor, vice, magnetic field dampening device and associated peripherals.
Figure 5:
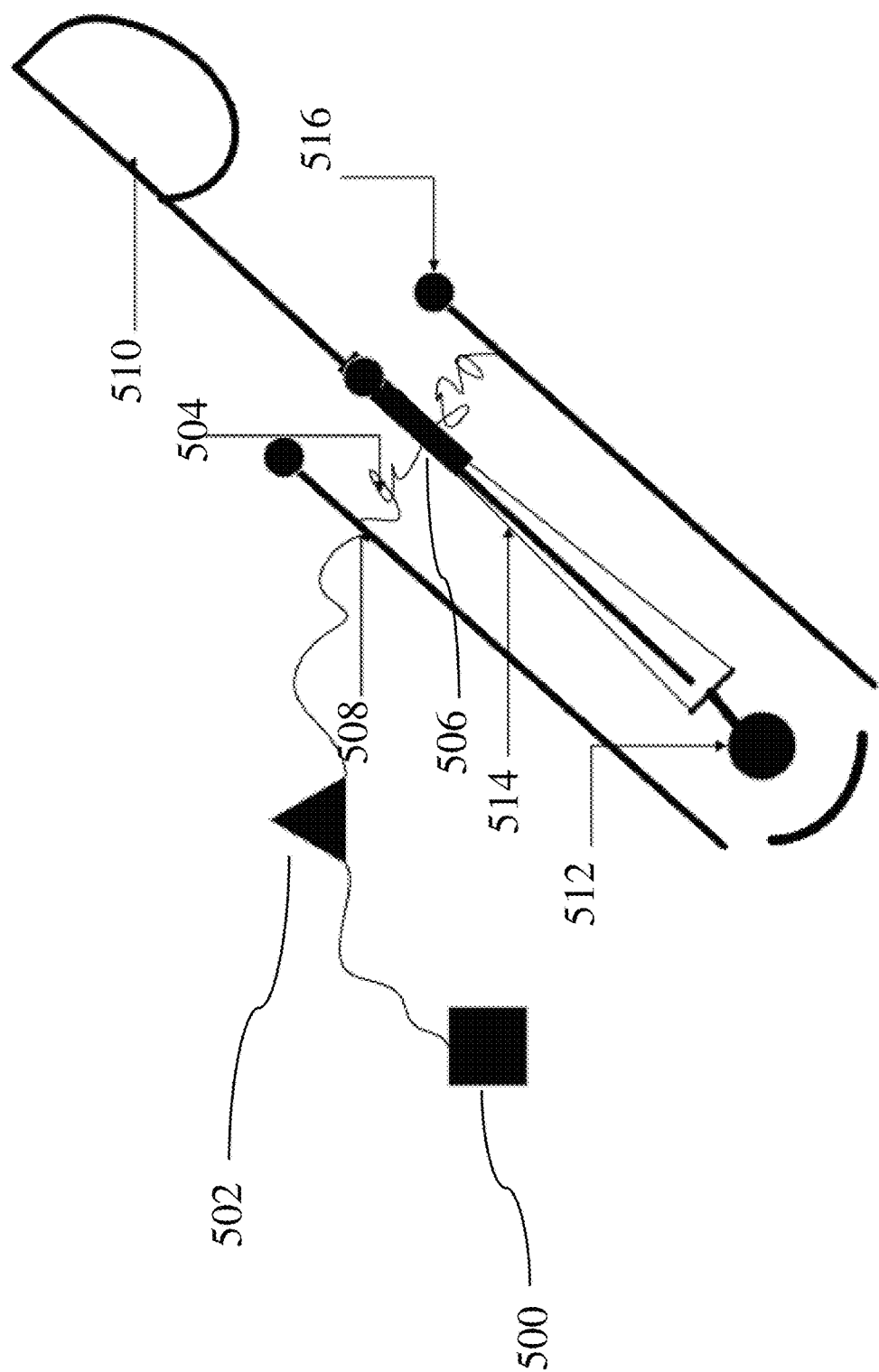
FIG. 5 shows a line drawing of an oral hygiene device and holder with a ball and socket joint, vice, magnetic field dampening device and associated peripherals.

In this disclosure the term 'oral hygiene device' refers to any device which may be used for the maintenance of a user's mouth, including but not limited to a toothbrush, a motorized toothbrush, a floss pick, a water flosser, a tongue scraper, a scrolling toothbrush, scrolling flosser, or a stationary mouth guard further comprising components including but not limited to motorized brushes, dental debris suction devices, bacteria removing cloth wipers, ionic emitting cleansers, ultraviolet light, liquid chambers and nozzles to spray mouthwash, peroxide tooth cleanser, toothpaste, or other oral cleansing liquid, gel, or paste, scrolling mechanism, or any combination of the aforementioned. In this disclosure, the term 'scrolling' refers to embodiments of the apparatus that involve mechanisms for moving devices along the gum-line. In the case of a scrolling toothbrush this may include a tooth-brush assembly of a plurality of brushes, which may be circular and motorized facing opposite angled or perpendicular directions, and utilize the mechanical methods of propulsion including but not limited to the rotation of said brushes to move in some embodiments, a motor, wheel or pulley system along a track or mouth guard to move in others. In the case of a scrolling flosser or combination scrolling tooth-brush with a flosser the device may utilize the same means of propulsion as a scrolling tooth-brush, but comprise a component allowing a spool of floss to move from one side of the gum-line to the other, effectively allowing a fresh piece of floss to clean out one gap to the next as the floss moves in and out accomplished by mechanisms including but not limited to any combination of motorized pistons and spoolers, compressed gas driven pistons, hydraulic pistons, magnetic pistons, pulley driven spoolers or a single piece of floss held in a floss pick that gradually shifts from the front of the teeth gap to the back as it moves along the gum-line, and is replaceable. The scrolling flosser may be disassembled to allow a new spool of floss to be utilized in some embodiments. In some embodiments, the scrolling flosser may include a sensor that detects caps between the user's teeth and sends a signal to the scrolling mechanism to stop the floss there, press the floss into the user's gum until the desired pressure is achieved and retract the floss, restarting the scrolling to the next gap.

One feature shared by all embodiments of the disclosure is the dampening mechanism. The dampening mechanism may be as simple as means including but not limited to an adjustment mechanism for the scrolling toothbrush design that gives the parallel facing brushes enough play to glide along the user's teeth while applying enough pressure to adequately brush them utilizing means including but not limited to gears and clamps, moving in a limited range of motion, elastics or springs pressing the brushes with limited resistance into the user's teeth, a mouth guard device adjusting the pressure used by a suction device to pull bacteria from user's teeth, emit a jet of plaque removing liquid with regulated force, or any combination of the aforementioned to provide a limited present amount of pressure, or as complex as a magnetic oral hygiene device holder comprising a magnet stem which may be attached to the detachable base of a magnetic oral hygiene device such as toothbrush or tongue scraper with a magnetic base, said oral hygiene device further comprising a direction mechanism with a magnetic field adjuster which may be one of a variety of designs including but not limited to a dial adjusted mechanism directly attached to the oral hygiene device holder, a digital remote adjustment mechanism allowing the user to set the range of pressure applied, or a combination device involving a sensor in the attachment mechanism which sends a signal to the holder the moment resistance is detected and the holder responds by increasing the magnetic field in order to apply the desired pressure to teeth or gums that the oral hygiene device is touching. In some of the magnetic embodiments when a user applies a given force to the holder, the magnetic field will provide a force equal and opposite of the direction provided by the user, less the force necessary to generate the minimal amount of friction required to clean teeth. The counter-balancing effect ability of the control system allows the user a regular an unmodified force without ever exceeding the desired magnitude of force desired. In other such embodiments instead of the force applied by the magnetic field being less than or equal to the force applied by the user so as to generate the minimal amount of friction required to clean teeth, the user merely needs to move the oral hygiene device near to the mouth and the magnetic field will activate so as to apply the force needed to clean teeth, by means including but not limited to the user depressing a button, receiving an audio command from the user, or camera's on the unit designed to recognize the proximity of teeth. The attachment mechanism is a means of affixing the oral hygiene device holder to the oral hygiene device. The oral hygiene device holder may be shaped as one of several designs including but not limited to a tube, a platform, or a mouth guard. In some embodiments the attachment mechanism may be one of or any combination of the following including but not limited to a clamping mechanism in some such embodiments utilizing a plurality of tongs attached to the holder to grasp the instrument, an elastic grasping mechanism utilizing one or more elastic mechanisms to twist and tighten around the instrument thus holding it in place and/or directing it, a magnetic coupling mechanism magnetically attaching itself to one or more magnets on the instrument allowing the holder to direct the instrument, and/or a screw in mechanism allowing the instrument to be screwed into the holder one of the two having a male connection component and the other a female.

In some embodiments, the oral hygiene device holder may be charged by means including but not limited to plugging the device directly into an outlet, in others it may be tethered by means including but not limited to a lightning cable, usb, or plug to an outlet, battery or charged device, or placing it on a charging pad, the device comprising a rechargeable battery compatible with said means in some such embodiments. In some embodiments, the disclosed device may include a motion sensor and/or a motion response mechanism allowing the device to autonomously react to motion within the user's oral cavity in means similar to the pressure dampening mechanism response, but which in some embodiments may also include adjusting the pressure applied by the device. In some such embodiments, the device may include a light and vibration pressure regulation mechanism, which may allow the device to adjust the amount of ultraviolet or visible light emitted, allowing the user to see and/or to neutralize bacteria harmed by ultraviolet radiation, or to regulate the pressure generated by the device vibrating as the user's mouth is cleaned. This may most easily be visualized in the mouth guard embodiments. In some such embodiments, the device may also include vibration and lighting indicators, allowing the device to autonomously respond in adjusting the light and vibration pressure regulation mechanism. In other embodiments the device may comprise a web enabled device that transmits or records data associated with usage. This may allow the device to send a signal showing data including but not limited to a camera showing the users mouth or a representation of the users mouth, health data concerning the users mouth, or data related to the performance of the oral hygiene device, and transmitting it an output device including but not limited to a cellular phone, tablet, television, computer, virtual reality glasses, augmented reality glasses, or a smart mirror my means including but not limited to bluetooth, wifi, or usb. In some embodiments the device may be a scrolling brush containing components such as a timer allowing it to keep track of how much time is spent on each tooth, a top scroller allowing it to scroll along the top and bottom teeth simultaneously, or further comprising a scrolling mechanism capable of adjusting the displacement between top and bottom rows of teeth brushes so that one of the scrolling brushes moves laterally as both move horizontally adjusting for the difference in lateral space between the top and bottom teeth as the scrolling brushes move. These adjustments may be made by means including but not limited to malleable wires, gaps on a track directed by wheels, or a string that both brushes move along while attached to one another via elastic bands.

In some embodiments of the disclosure the device apparatus may be an oral hygiene device holder, 100, attached to an oral hygiene device, in this case a toothbrush, 102, directly attached to the apparatus in a pressurized base, 104. In certain embodiments, the pressurized base may be used to regulate the pressure applied to the user's mouth once pressure is sensed indicating the oral hygiene device has made contact with a component, the pressurized based operating as a pressure sensing base. In some embodiments, the pressurized may also be used to move the brush in a circular, vertical, or horizontal fashion semi-autonomously. In some such embodiments, the pressurized base may be filled with a viscous fluid in one or more chambers that works to move the oral hygiene device hydraulically or pneumatically.

In some embodiments of the disclosure a battery power source, 200, may send power through a resistor, 202, and feed a magnet-holder, 204, also feeding the oscillating motor, 206, as it directly powers the magnet-holder, via a holder, 208, adjusting the position of the magnetic-brush, 210, which has brushes located between the magnet's held by the magnet-holder and is pivoted along the play allowed by the ball-in-socket/universal joint, 212, and signals are sent by the contact/proximity sensors, 214. The energy from the battery power source may be used to power the magnets and adjust the force applied.

In some other embodiments of the disclosure a battery power source, 300, may send power through a resistor, 302, and feed a magnet-holder, 304, via a holder, 308, adjusting the position of the magnetic-oral hygiene device, 310, which has magnets located between the magnets held by the magnet-holder to which signals are sent by the contact/proximity sensors, 314. The oral hygiene device in this case may include but is not limited to a toothbrush, motorized toothbrush, floss pick, or a tongue scraper.

In some other embodiments of the disclosure a battery power source, 400, may send power through a switch, 402, feeding a spring damper, 404, attached to an anchor, 406, adjoining it to a holder, 408, as it guides an oral hygiene device, 410, which is pivoted along the play allowed by the ball-in-socket joint, 412, gripping the anchor via a vice component, 414, the assembly guided by a mechanical linkage, 416, comprising rotating motor, 418. In some other such embodiments the apparatus may further comprise contact/proximity sensors, 420, capable of sending signals to control the force of the spring-damper and/or the motion of the rotating motor.

In yet other embodiments of the disclosure a battery power source, 500, may send power through a switch, 502, feeding a spring damper, 504, attached to an anchor, 506, adjoining it to a holder, 508, as it guides an oral hygiene device, 510, which is pivoted along the play allowed by the ball-in-socket joint, 512, gripping the anchor via a vice component, 514, the unit further comprising contact/proximity sensors, 516, capable of sending signals to control the force of the spring-damper.

Figure 6:
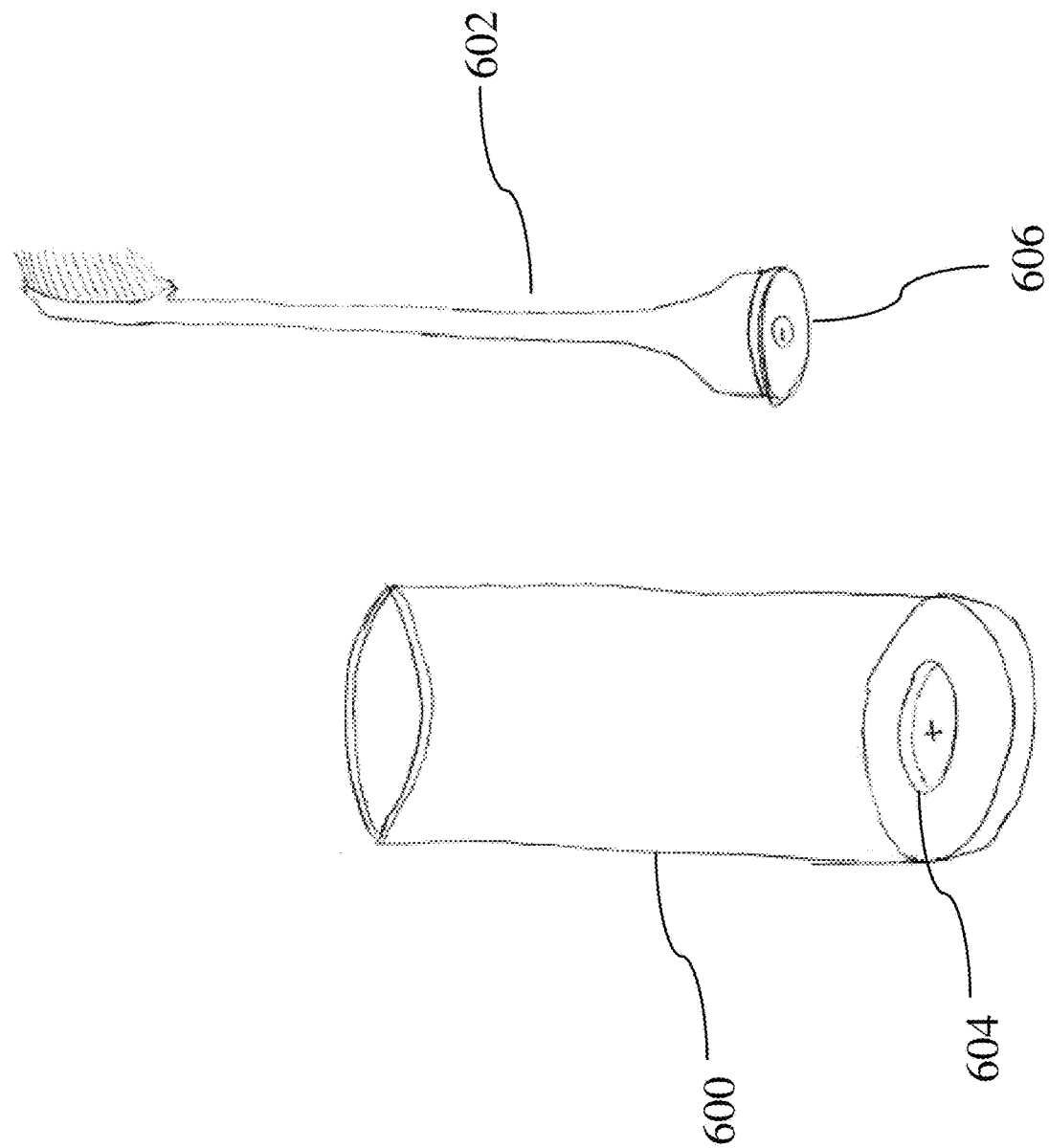
FIG. 6 illustrates a line drawing of an oral hygiene device and holder with a magnetic connector between the two, in this case the device being a toothbrush.

FIG. 6, illustrates an oral hygiene device holder 600, separate from an oral hygiene device, in this case a brush, 602, which may be attached to the holder at a magnetic linkage, 604, matching a magnetic attachment on the brush, 606, the magnetic assembly allowing for force dampening as the user cleans their teeth.

Figure 7:
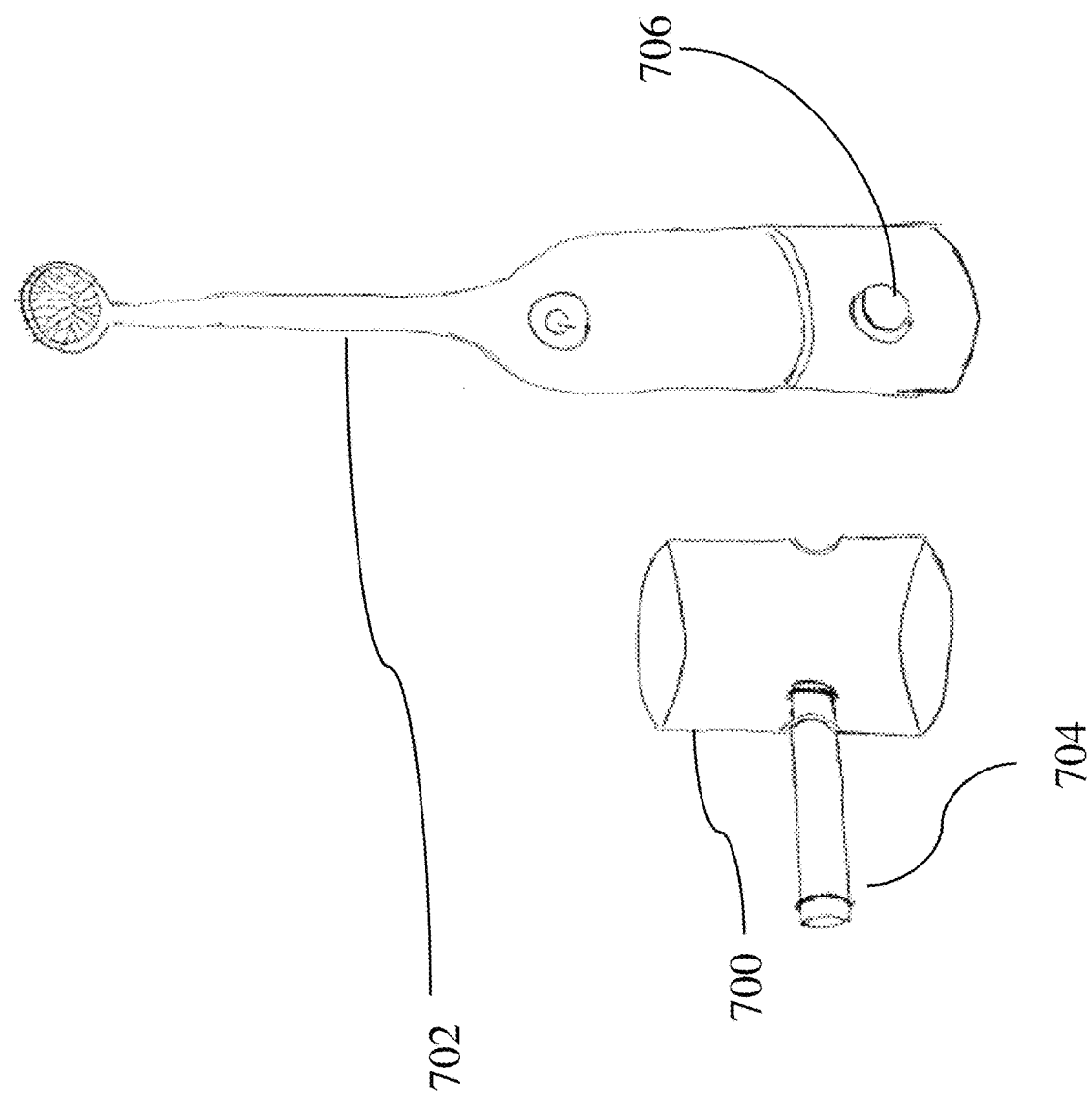
FIG. 7 illustrates a line drawing of an oral hygiene device and holder with an adjoining connector between the two, in this case the device being a motorized toothbrush.

FIG. 7, illustrates an oral hygiene device holder 700, separate from an oral hygiene device, in this case a motorized brush, 702, which may be attached to the holder at mechanical linkage, in this case an insertable-bar 704, adjoined through a link, in this case a hole fitting the bar in the motorized toothbrush, 706, the holder providing visual or auditory feedback related to the force applied as a semi-autonomous force dampening mechanism for the user to react and self-regulate force applied as they clean their teeth.

Figure 8:
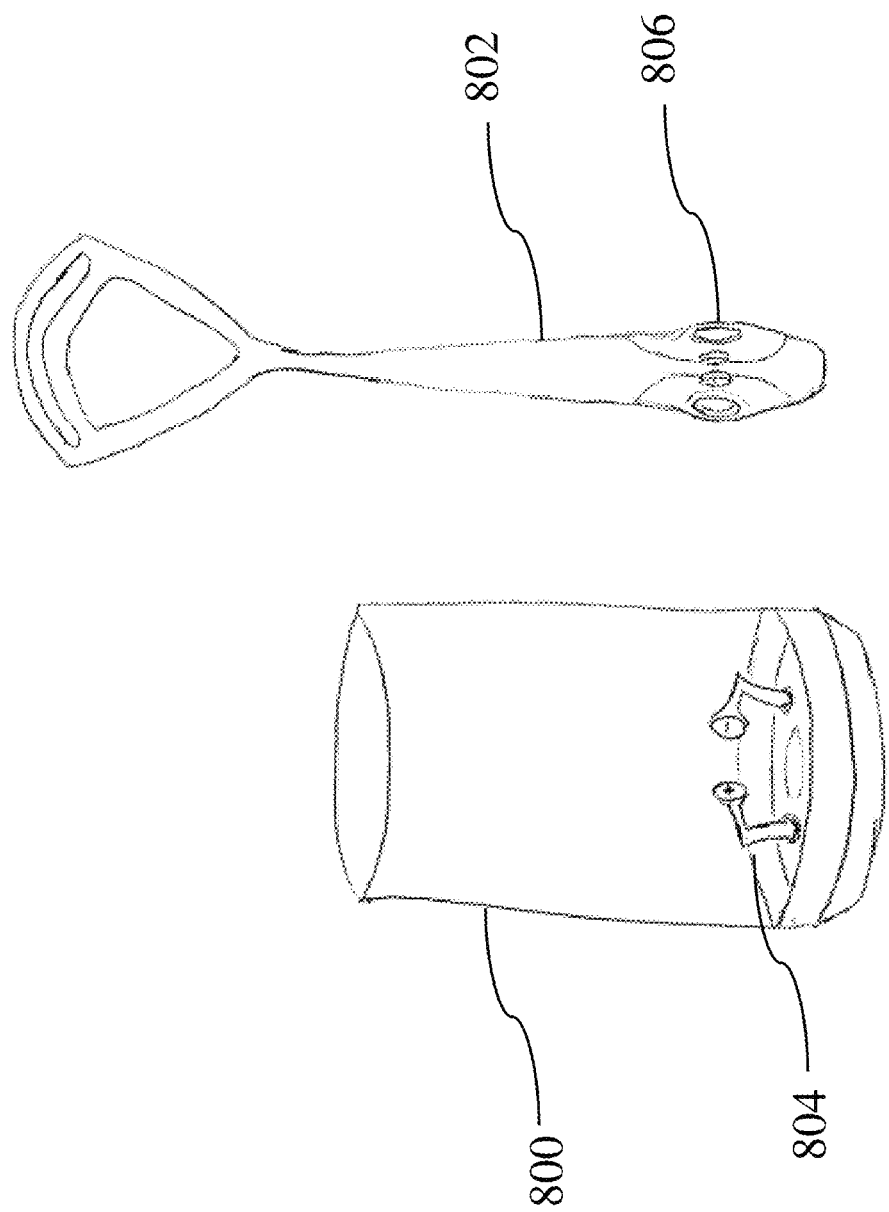
FIG. 8 illustrates a line drawing of an oral hygiene device and holder with a magnetic clamp being used to connect and adjoin the two, in this case the device being a tongue scraper.

FIG. 8, illustrates an oral hygiene device holder 800, separate from an oral hygiene device, in this case a tongue-scraper, 802, which may be attached to the holder via a magnetic piston assembly, 804, which may be attached to the oral hygiene device at a section with holes, or compatible magnets, 806, and regulate the force applied by operating by means including but not limited to, motors driving the magnetic piston assembly, hydraulics being pressurized in the base of the oral hygiene device holder, or a spring system which applied a limited amount of fore when the oral hygiene device is pressed onto an opposing surface, in some embodiments the magnetic piston assembly driving the motion.

Figure 9:
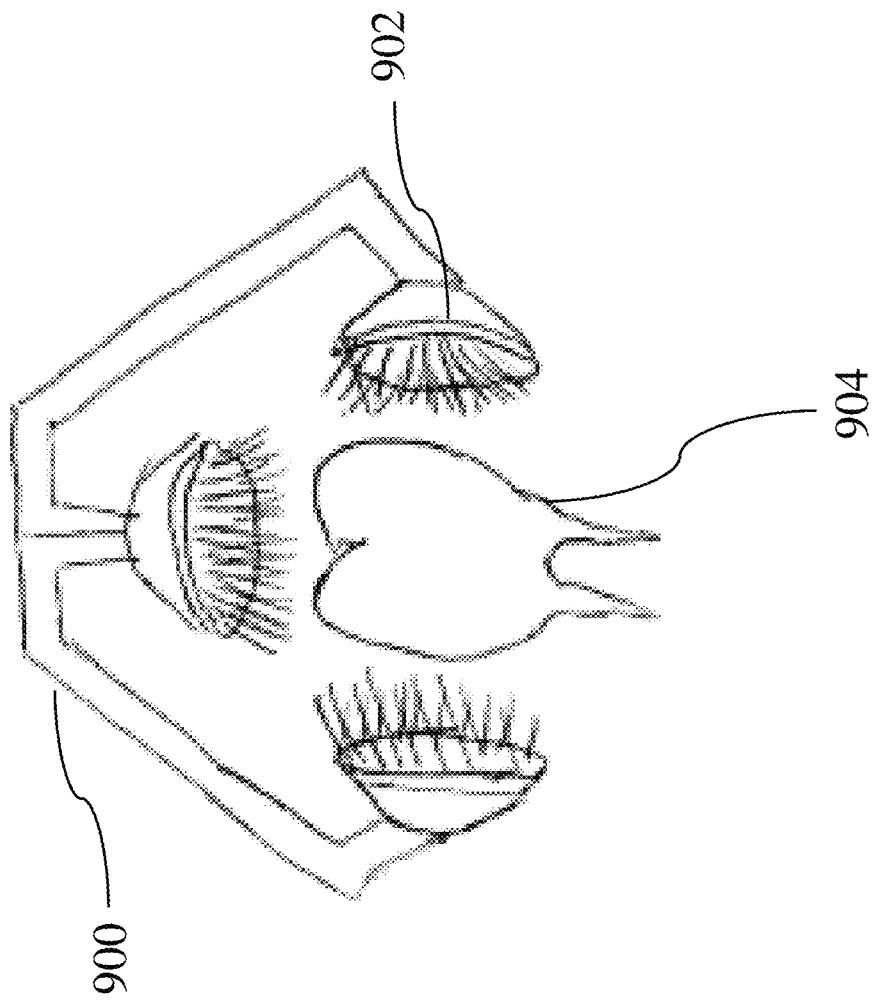
FIG. 9 illustrates a line drawing of an oral hygiene device in this case the device being a motorized scrolling toothbrush with force applying and dampening technology.

FIG. 9, illustrates a motorized scrolling toothbrush 900, comprising a set of toothbrushes with force dampening technology, 902, allowing them to squeeze onto a row of teeth, 904, applying the desired force as they rotate to clean, and in some embodiments rotate to scroll in a particular direction or inject fluid in other embodiments.

Figure 10:
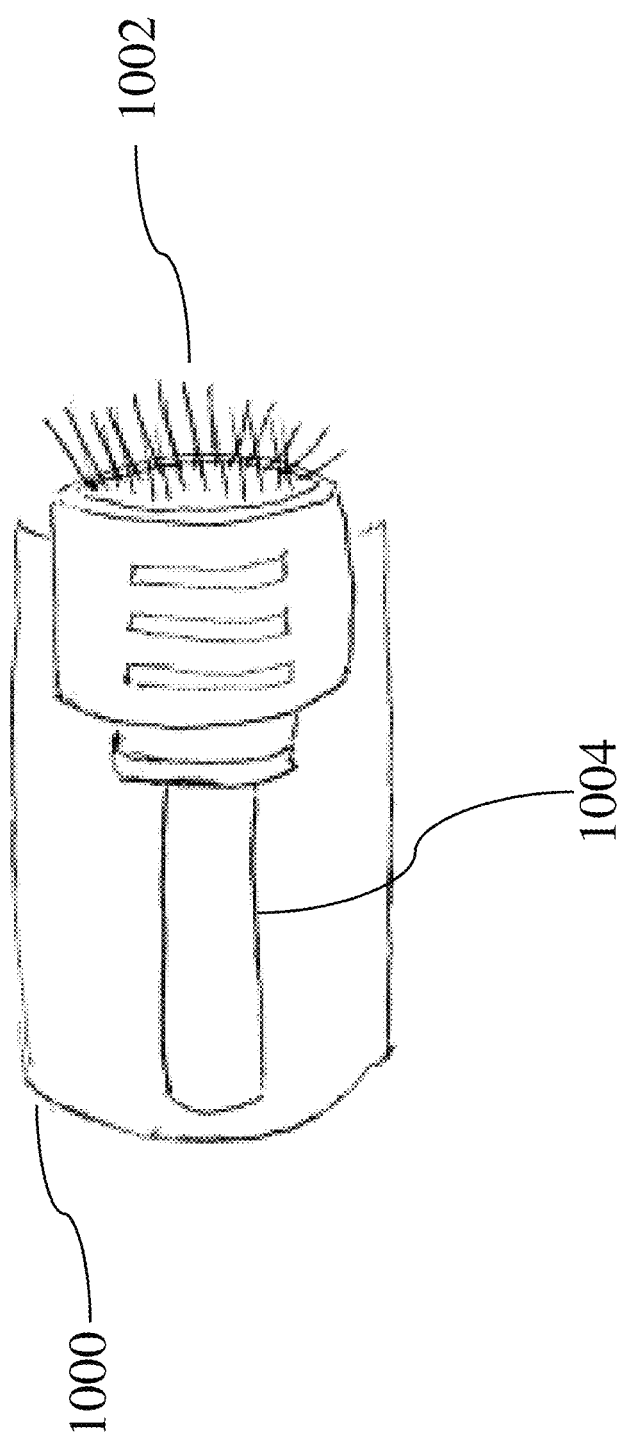
FIG. 10 illustrates a line drawing of an oral hygiene device component in this case the device being a motorized scrolling toothbrush and the component being a piston for a brush head with force applying and dampening technology.

FIG. 10, illustrates a scrolling toothbrush or mouth guard brush chamber, 1000, further comprising a motorized brush head, 1002, which may be driven into or away from the user's teeth by the piston, 1004, utilizing force dampening or applying technology to apply the force or force dampening desired.

Figure 11:
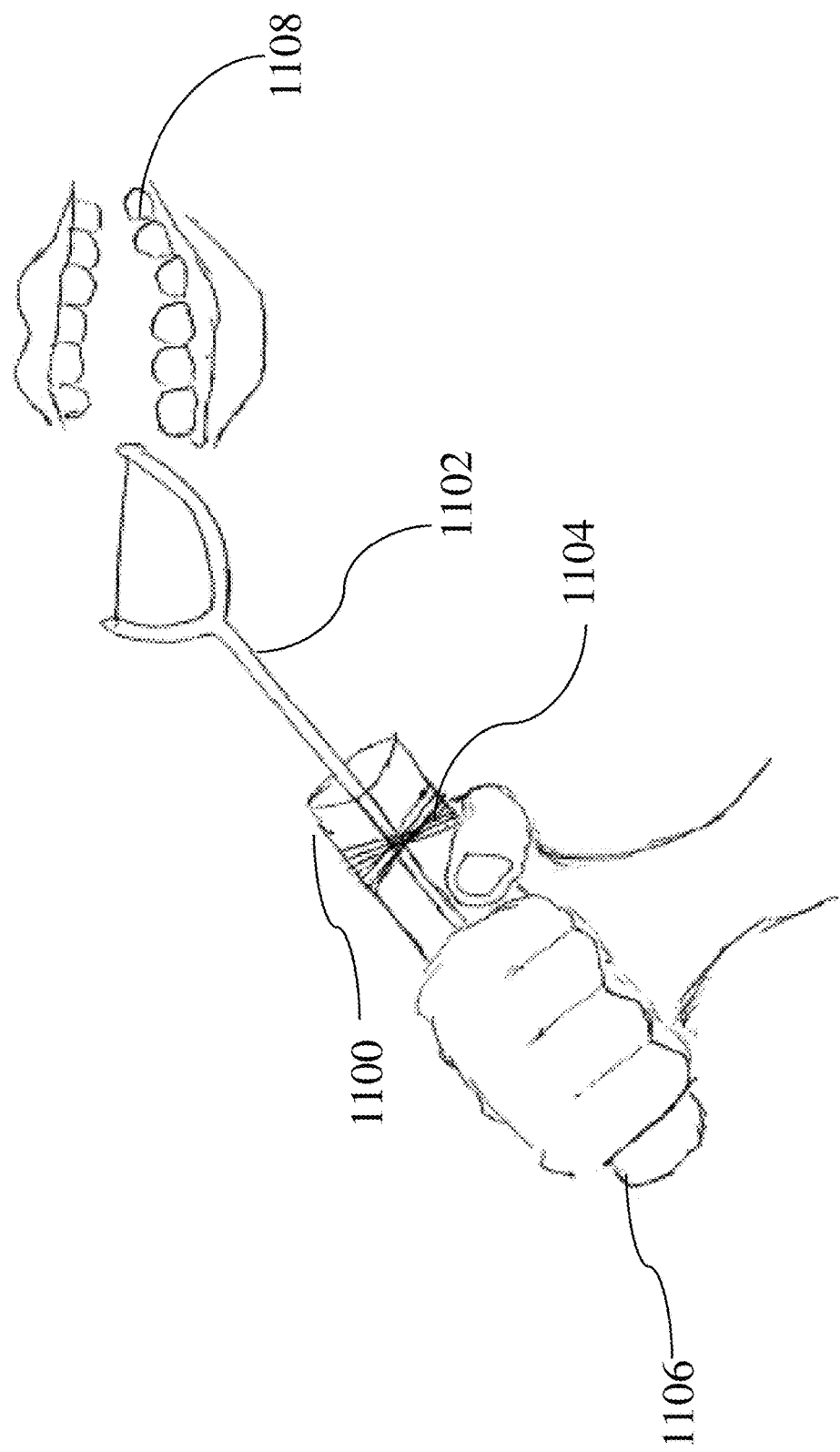
FIG. 11 illustrates a line drawing of an oral hygiene device and holder in this case the device being a flosser pick and the holder utilizing elastics to grasp the device.

FIG. 11, illustrates an oral hygiene device holder, 1100, gripping an oral hygiene device, in this case a floss picker, 1102, which may be attached to the holder by a plurality of elastic or string attachments, 1104, force being applied from a pressure regulation mechanism in the base, 1106, in some embodiments the elastic or string attachments squeezing an adjustable diaphragm around the oral hygiene device.

Figure 12:
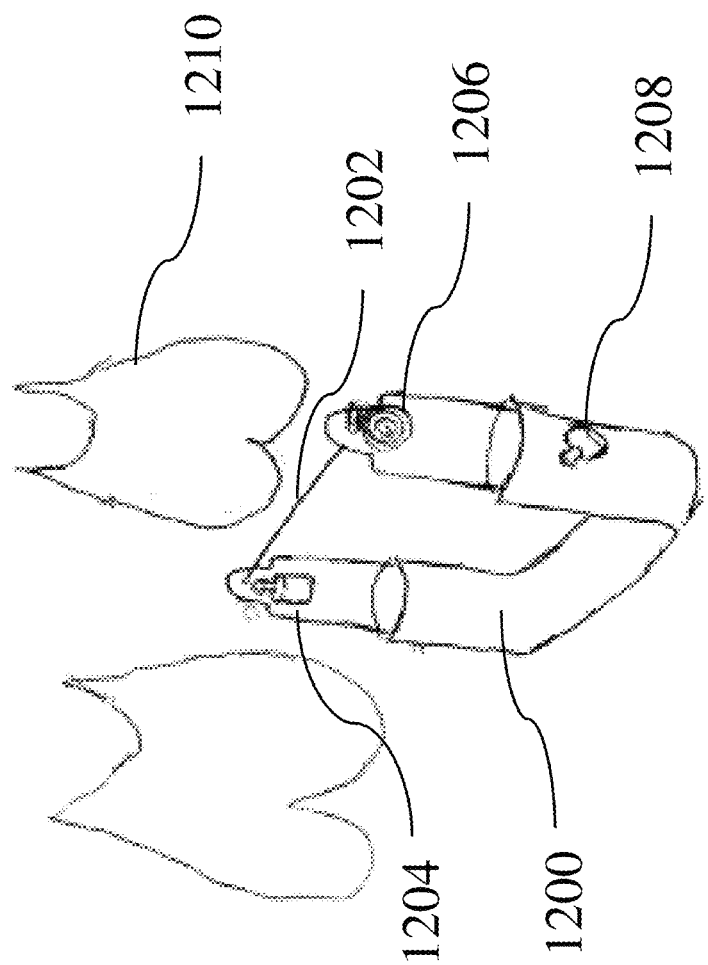
FIG. 12 illustrates a line drawing of an oral hygiene device in this case the device being a motorized scrolling flosser with motors for scrolling the floss from one spool to the next, and for moving the pistons and floss in and out of the user's teeth simultaneously.

FIG. 12, illustrates an oral hygiene device in this case the device being a motorized scrolling flosser, 1200, with motors, 1204, with motors for scrolling the floss from one spool to the next, and for moving the pistons and floss in and out of the user's teeth simultaneously for scrolling the floss, 1202, from one spool, 1204, to the next, 1206, and for moving the pistons and floss in and out of the user's teeth simultaneously as an additional motor turns, 1208. In some such embodiments, this device may be a component of a scrolling toothbrush, in others it may protrude from a mouth guard.

Figure 13:
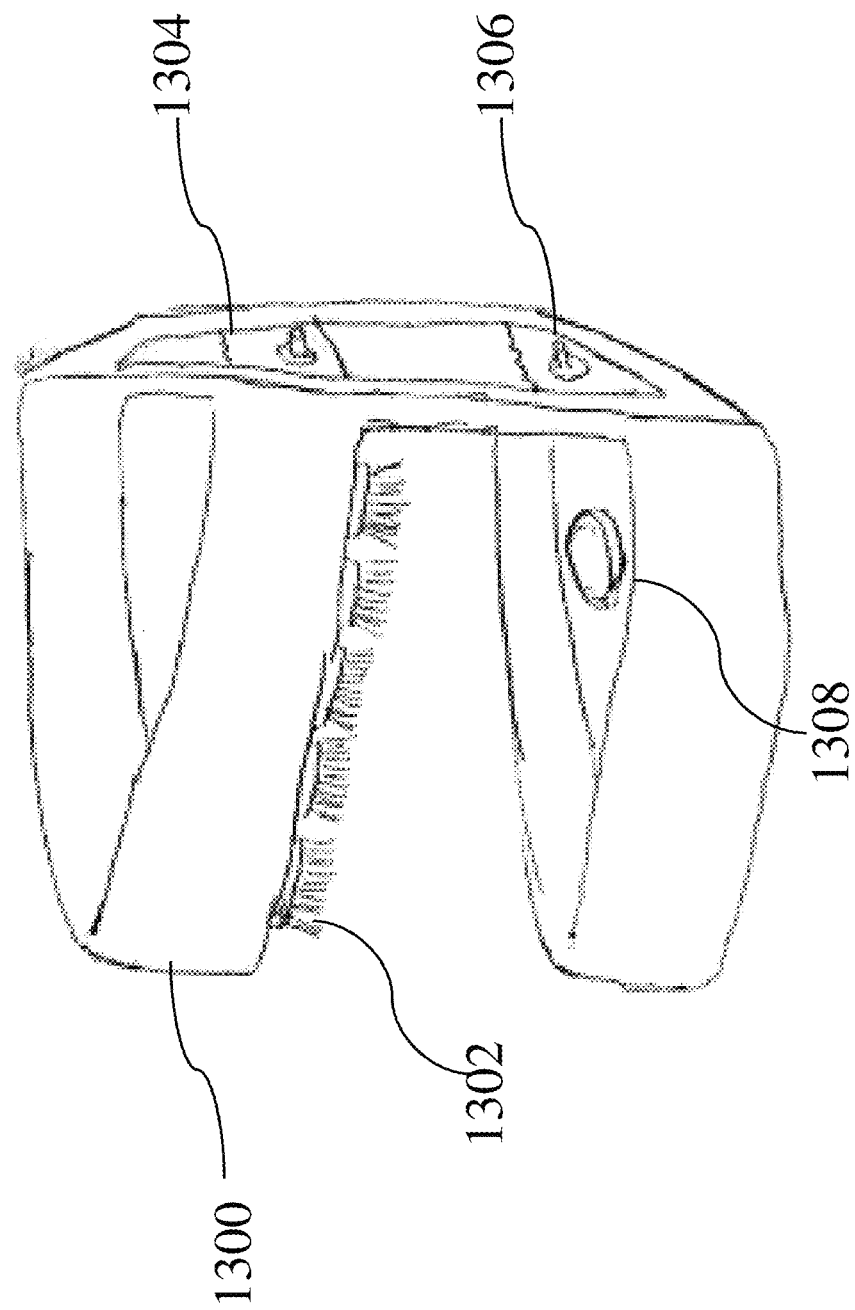
FIG. 13 illustrates a line drawing of an oral hygiene device in this case the a mouth guard with a plurality of brushes for teeth cleaning, two fluid chambers and associated nozzles for spraying mouthwash, and an ultraviolet light for bacterial removal.

FIG. 13, illustrates an oral hygiene device, in this case a mouth guard, 1300, with a plurality of motorized brushes for teeth cleaning, 1302, two fluid chambers, 1304, and associated nozzles for spraying fluid, in this case mouthwash, 1306, and an ultraviolet light for bacterial removal, 1308. In some embodiments, the fluid may be a paste which can be sprayed from nozzles in the motorized brushes, in some such embodiments the ultraviolet light may activate after a period of time has elapsed since the user's mouth has closed and turn off after a certain additional preset amount of time, in other embodiments an ion emitter may be used in lieu of one or more ultraviolet lights.

Figure 14:
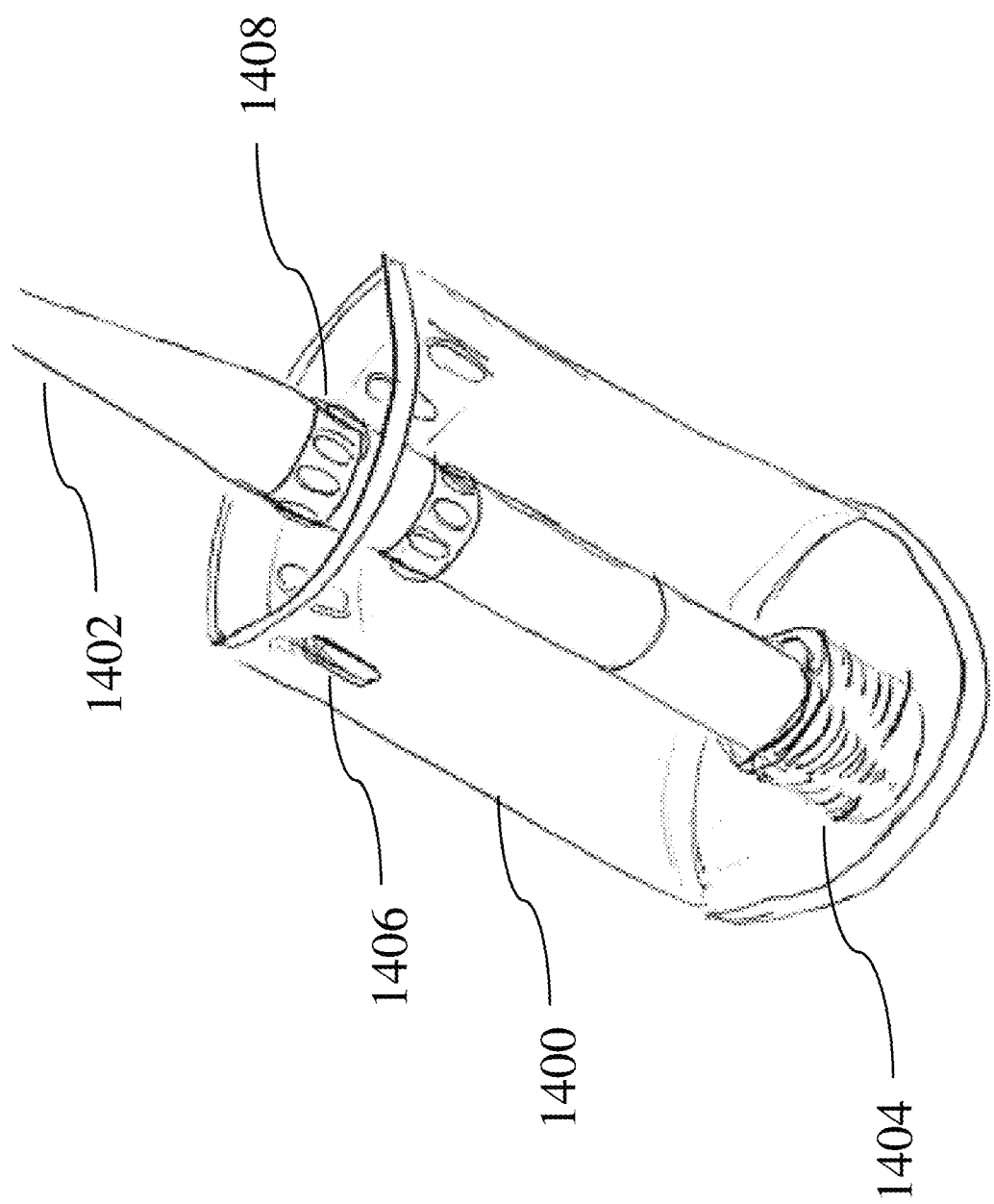
FIG. 14 illustrates a line drawing of an oral hygiene device and holder, in this case the device being screwed into the holder, both of which utilize a series of magnets for attraction and repulsion for force generation and dampening.

FIG. 14, illustrates an oral hygiene device holder 1400, comprising from an oral hygiene device, in this case a motorized toothbrush, 1402, which may be attached to the holder at base of the holder, 1404, said holder further comprising one or more magnets, 1406, that can be used to operate a magnetic field, thereby controlling the motion or force dampening of the magnetic assembly controlling the force via one or more magnets, 1408, attached directly to the oral hygiene device, as the user cleans their teeth.

Figure 15:
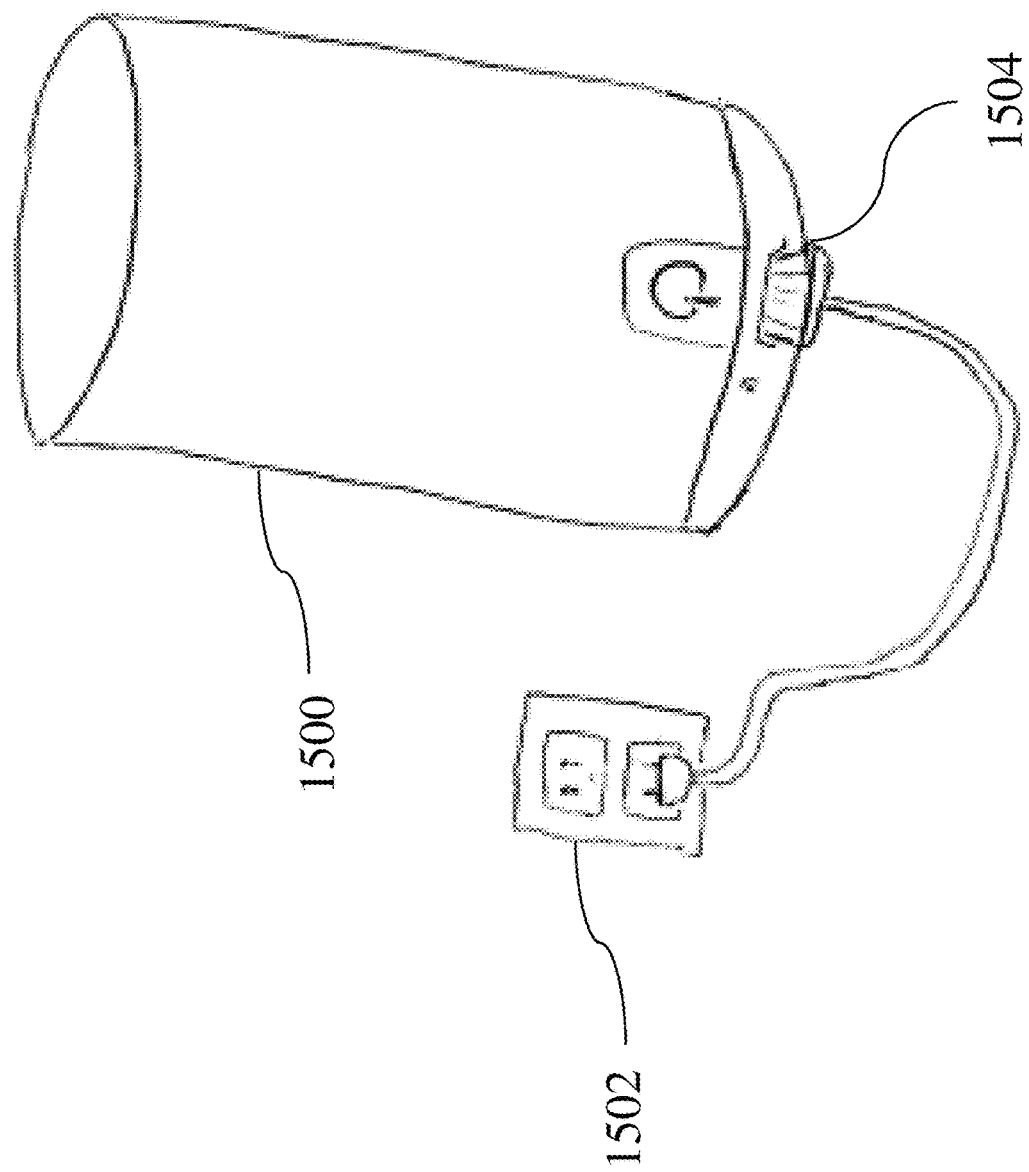
FIG. 15 illustrates a line drawing of an oral hygiene holder, tethered two an outlet for charging.

FIG. 15, illustrates an oral hygiene device holder, 1500, plugged into an outlet, 1502, via a tether, in this case a USB, 1504, which may be used to charge the device so that it can operate its motion or force dampening mechanism.

Figure 16:
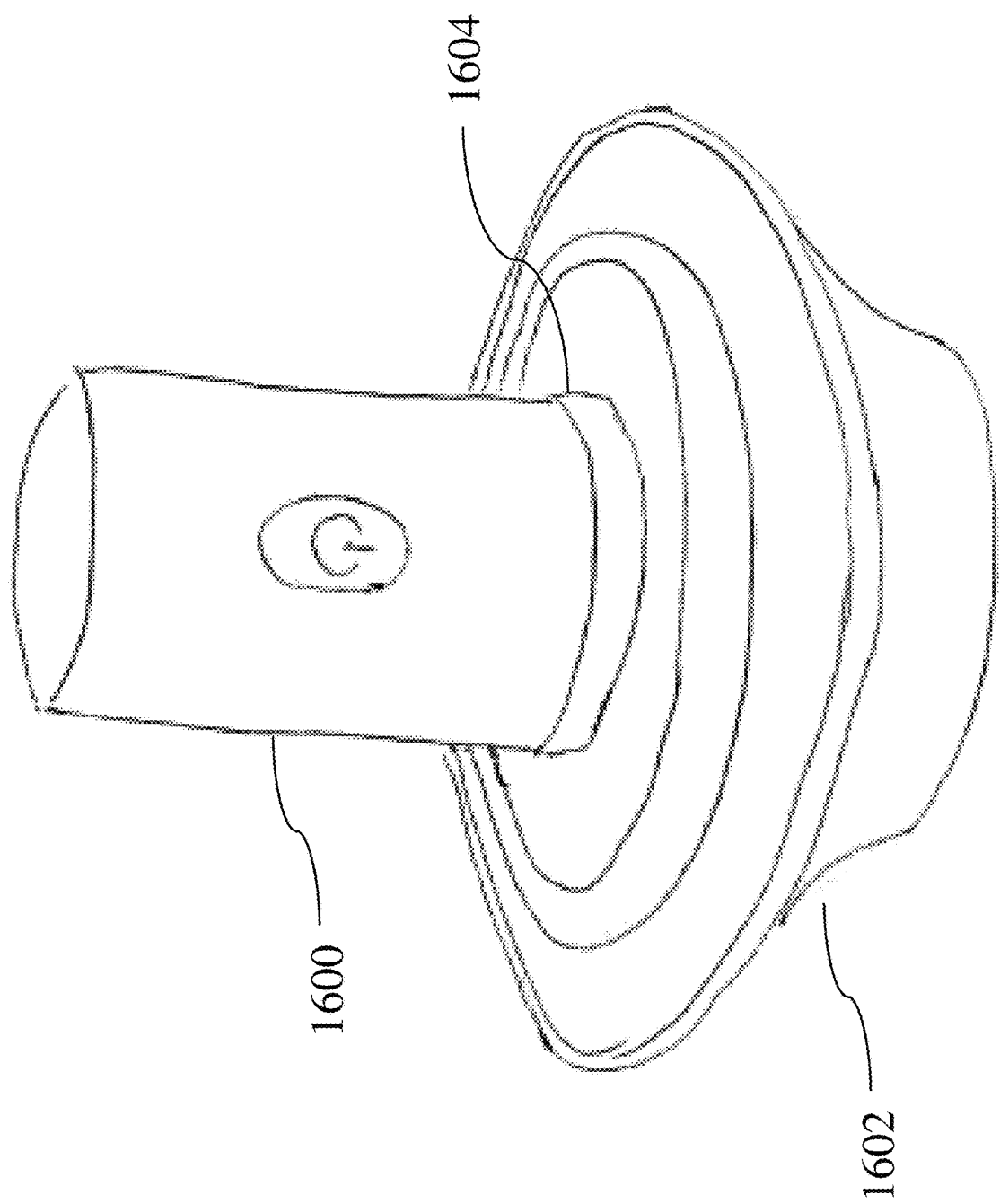
FIG. 16 illustrates a line drawing of an oral hygiene holder, with a chargeable battery, sitting on a charging pad for recharging.

FIG. 16, illustrates an oral hygiene device holder 1600, seated atop a charging pad, 1602, which may the oral hygiene device's battery, 1604, located in the base in the illustrated embodiment.

Figure 17:
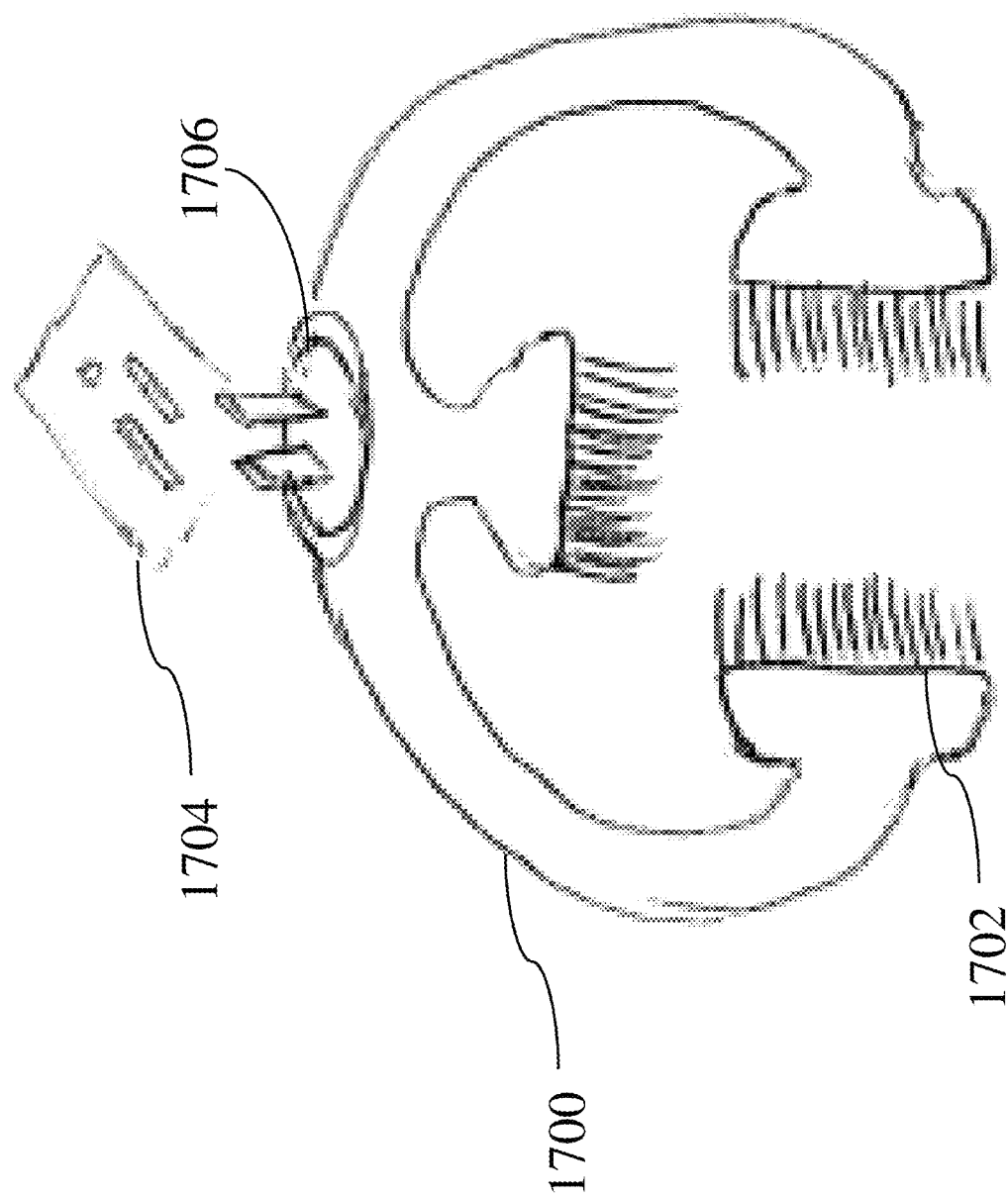
FIG. 17 illustrates a line drawing of an oral hygiene device, in this case being a scrolling toothbrush, as it is plugged into an outlet directly for charging.

FIG. 17, illustrates an oral hygiene device in this case being a scrolling toothbrush 1700, further comprising a plurality of brushes, 1702, as the device may be plugged directly into an outlet, 1704, as it is charged through a plug, 1706, in certain embodiments the plug being removable for ergonomic mouth insertion.

Figure 18:
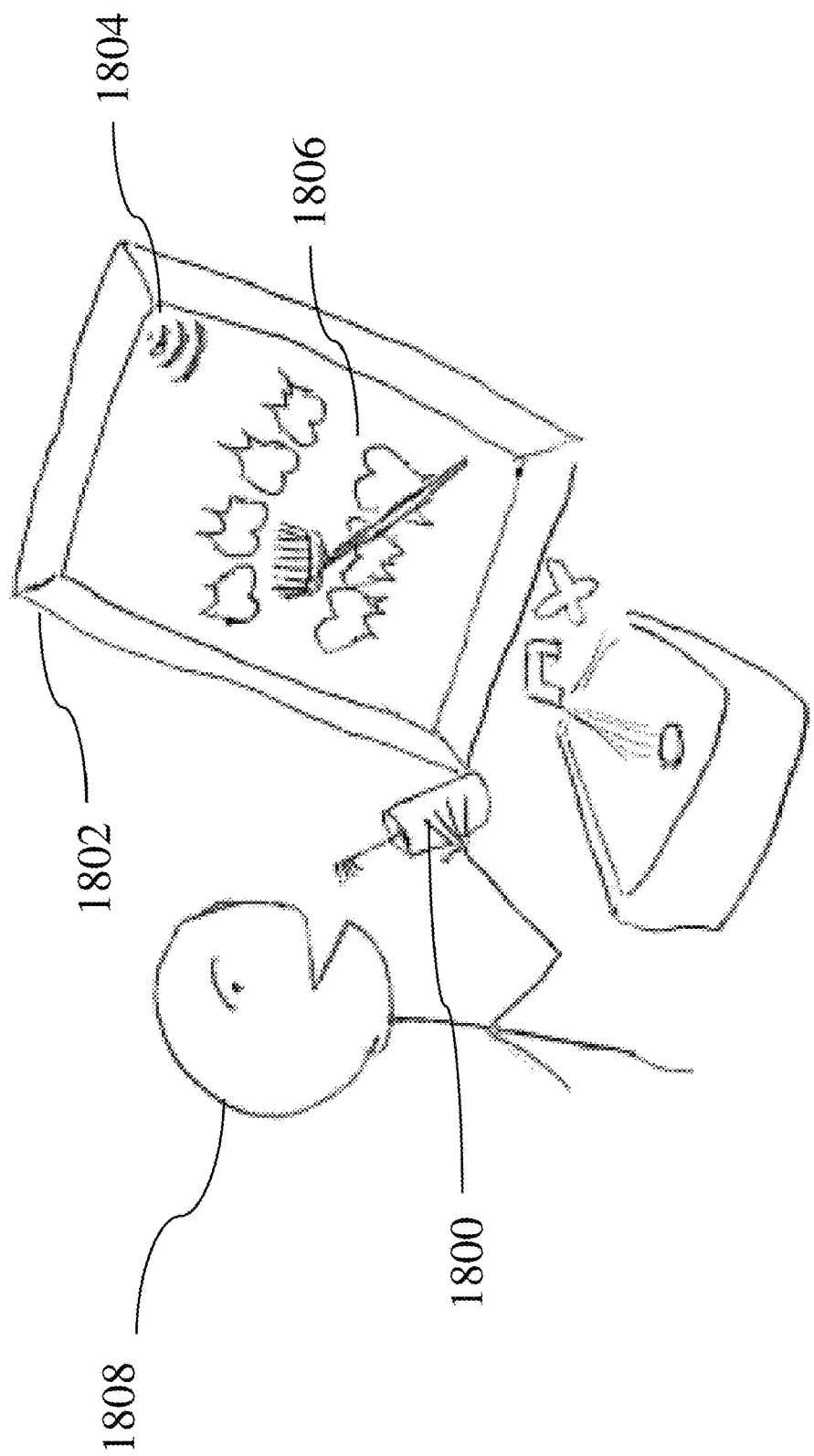
FIG. 18 illustrates a line drawing of an oral hygiene holder or device transmitting a signal wirelessly displaying data related to a user's use of the device, in this case being a representation of them cleaning their teeth being displayed on a wifi/display enabled mirror.

FIG. 18, illustrates an oral hygiene device holder 1800, sending a wireless signal to a display device, in this case a wireless local area network or bluetooth enabled mirror 1802, which may display a symbol to indicate a connection has been established, in this case a wi-fi symbol, 1804, as it displays data related to the user's oral health or the device condition, in this case camera footage of the user's mouth as it's cleaned, 1806, as the user, 1808, holds the oral hygiene device.

Some embodiments of the present disclosure may involve the method of assembling an oral hygiene device, comprising a plurality of mouth guards. A method of assembling such an oral cleaning mouth guard comprises the steps of installing one or more motorized brushes in said mouth guard, filling one or more fluid chambers in said mouth guard with fluid, installing an ion emitter in a powered slot of said mouth guard, installing one or more ultraviolet lights in powered slots of said mouth guard, installing one or more spooling flossers in said mouth guard, and/or installing one or more pressure regulation devices in said mouth guard in any particular order. In other embodiments steps for charging the device may further comprise the steps of charging said mouth guard by plugging said device into an outlet, tethering said mouth guard to a powered device, placing said mouth guard on a charging pad, or installing one or more batteries in said mouth guard. Other methods revealed in the present disclosure may include methods of improving oral health utilizing a force dampening enabled oral hygiene device or holder which notifies the user through mechanisms including but not limited to visual (such as lights or displayed data), audio (such as beeps or explicitly stating too much force is being applied), or tactile (such as vibrating or gyroscopic disengagement), to reinforce good habits or notify a user when they are applying a damaging amount of force to certain sensitive regions of the mouth.

It is understood that the various preferred embodiments are shown and described above to illustrate different possible features of the invention and the varying ways in which these features may be combined. Apart from combining the different features of the above embodiments in varying ways, other modifications are also considered to be within the scope of the invention.

The invention is not intended to be limited to the preferred embodiments described above, but rather is intended to be limited only by the claims set out below. Thus, the invention encompasses all alternate embodiments that fall literally or equivalently within the scope of these claims.

Having thus described our invention, we claim:

1. An apparatus comprising:
an oral-hygiene device,
an oral-hygiene device holder, wherein the oral-hygiene device is disposed within the oral-hygiene device holder,
a pressure dampening mechanism attached to the oral-hygiene device, and
a mechanical linkage attaching the oral-hygiene device to the oral-hygiene device holder, wherein the oral hygiene device and mechanical linkage are adjoined through a link, said oral hygiene device holder providing visual or auditory feedback responsive to a force applied to the oral-hygiene device by a user, wherein the pressure dampening mechanism includes a magnetic stem attached to the oral-hygiene device and one or more magnets affixed to the inside of the oral-hygiene device holder.

2. The apparatus described in claim 1 further comprising:
a) a proximity sensor.

3. The apparatus described in claim 2 further comprising:
an ultraviolet light for bacterial removal.

4. The apparatus described in claim 2 further comprising:
a web enabled device that transmits or records data associated with usage.

5. The apparatus described in claim 1,
wherein said one or more magnets affixed to the inside of the oral-hygiene device holder include at least one first magnet on said oral-hygiene device-holder; and
at least one second magnet on said oral-hygiene device holder,
wherein said at least one first magnet is diametrically opposed to at least one second magnet.

6. The apparatus described in claim 5 further comprising:
a charging station compatible battery.

* * * * *